US012623535B2

(12) United States Patent
Kim et al.

(10) Patent No.: US 12,623,535 B2
(45) Date of Patent: May 12, 2026

(54) TORQUE VECTORING DEVICE FOR A VEHICLE

(71) Applicants: HYUNDAI MOTOR COMPANY, Seoul (KR); KIA CORPORATION, Seoul (KR)

(72) Inventors: Dae Young Kim, Hwaseong-si (KR); Kwang Min Choi, Seoul (KR); Baek Yu Kim, Hwaseong-si (KR); Chul Min Ahn, Anyang-si (KR); Sung Gon Byun, Hwaseong-si (KR); Sun Sung Kwon, Anyang-si (KR); Jun Hoi Huh, Seongnam-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 287 days.

(21) Appl. No.: 18/139,990

(22) Filed: Apr. 27, 2023

(65) Prior Publication Data

US 2024/0149668 A1 May 9, 2024

(30) Foreign Application Priority Data

Nov. 9, 2022 (KR) ........................ 10-2022-0148986

(51) Int. Cl.
| | |
|---|---|
| *F16H 48/36* | (2012.01) |
| *B60K 17/04* | (2006.01) |
| *B60K 17/354* | (2006.01) |
| *B60K 23/04* | (2006.01) |
| *F16H 37/08* | (2006.01) |

(52) U.S. Cl.
CPC ............ *B60K 23/04* (2013.01); *B60K 17/043* (2013.01); *B60K 17/354* (2013.01); *F16H 37/082* (2013.01); *F16H 48/36* (2013.01); *B60K 2023/043* (2013.01); *F16H 2048/364* (2013.01)

(58) Field of Classification Search
CPC ............ B60K 17/354; B60K 2023/043; F16H 37/082
See application file for complete search history.

(56) References Cited

U.S. PATENT DOCUMENTS

| | | | |
|---|---|---|---|
| 10,995,840 B2 * | 5/2021 | Pinschmidt | ............ B60K 6/365 |
| 11,035,451 B1 | 6/2021 | Ahn et al. | |

(Continued)

FOREIGN PATENT DOCUMENTS

KR 20210089817 A 7/2021

*Primary Examiner* — Derek D Knight
(74) *Attorney, Agent, or Firm* — Lempia Summerield Katz LLP

(57) ABSTRACT

A torque vectoring device for a vehicle includes: a differential; a first planetary gear device including a first rotating element fixed to a transmission case and a second rotating element connected to a differential case of the differential; a second planetary gear device including a first rotating element connected to a motor, and a third rotating element connected to a third rotating element of the first planetary gear device; and a selective connector configured such that a second rotating element of the second planetary gear device can be selectively connected to one of the third rotating element of the second planetary gear device and a selected drive shaft which is one of two drive shafts coupled to the differential.

14 Claims, 9 Drawing Sheets

(56) References Cited

U.S. PATENT DOCUMENTS

| 2012/0058855 | A1* | 3/2012 | Sten | ........................ F16H 48/36 |
| | | | | 475/205 |
| 2020/0317041 | A1* | 10/2020 | Pinschmidt | .............. B60K 6/48 |
| 2021/0207698 | A1 | 7/2021 | Ahn et al. | |

* cited by examiner

TORQUE VECTORING DEVICE FOR A VEHICLE

CROSS-REFERENCE TO RELATED APPLICATION(S)

This application claims priority under 35 U.S.C. 119 to Korean Patent Application No. 10-2022-0148986, filed on Nov. 9, 2022, the disclosure of which is herein incorporated by reference in its entirety.

BACKGROUND

1. Field

The present disclosure relates to a technology for implementing vehicle torque vectoring.

2. Description of the Prior Art

Vehicles not only travel in straight, but also turns as a result of steering a steering wheel. While a vehicle is turning, a difference in speed between an inner wheel and an outer wheel occurs. As such, a differential is used for driving wheels of the vehicle to allow such a speed difference between left and right driving wheels.

The differential is a passive device that mechanically allows a speed difference between left and right driving wheels according to the difference in resistance occurring at the left and right driving wheels when the vehicle turns. Differentials have the advantage of facilitating vehicle's turns but have a drawback in that a vehicle having the differentials is difficult to escape from rough terrain or the like, which causes a substantial difference in road surface friction between the left and right driving wheels.

In order to overcome the above-mentioned drawback, differential motion limiting devices or the like are used to limit the differential function of differentials. There has recently been development of torque vectoring technology such that the torque applied to left and right driving wheels is actively controlled according to the vehicle traveling situation, thereby further improving the vehicle traveling performance.

The statements in this BACKGROUND section merely provide background information related to the present disclosure and may not constitute prior art.

SUMMARY

In an aspect of the present disclosure, a torque vectoring device for a vehicle is provided. In particular, torque vectoring of both driving wheels can be controlled by a relatively simple configuration such that the vehicle traveling performance can be improved, thereby ultimately improving the value of the vehicle.

In accordance with an aspect of the present disclosure, a torque vectoring device of a vehicle may include: a differential; a first planetary gear device including a first rotating element fixed to a transmission case, and a second rotating element connected to a differential case of the differential. The vectoring device further includes: a second planetary gear device including a first rotating element connected to a motor, and a third rotating element connected to a third rotating element of the first planetary gear device; and a selective connector configured to selectively connect a second rotating element of the second planetary gear device to the third rotating element of the second planetary gear device or a selected drive shaft which is one of two drive shafts coupled to the differential.

The first rotating element of the first planetary gear device may be a first ring gear, the second rotating element of the first planetary gear device may be a first carrier, the third rotating element of the first planetary gear device may be a first sun gear. In one form, the first rotating element of the second planetary gear device may be a second ring gear, the second rotating element of the second planetary gear device may be a second carrier, and the third rotating element of the second planetary gear device may be a second sun gear.

The selective connector may include: a first clutch gear connected to the second sun gear; a second clutch gear connected to the second carrier; a hub gear provided on the selected drive shaft; and a sleeve configured to be able to switch between a first state in which the sleeve slides straightly along an axial direction from the second clutch gear and thus meshes with the first clutch gear and a second state in which the sleeve meshes with the hub gear.

The first planetary gear device and the second planetary gear device may be disposed on a side on which the selected drive shaft is disposed with reference to the differential case.

An input gear may be connected to the first rotating element of the second planetary gear device, a drive gear may be connected to a rotating shaft of the motor, and a first idler gear and a second idler gear may be connected by a concentric shaft and are connected to the input gear and the drive gear, respectively.

The first rotating element of the second planetary gear device may be connected to the motor through a third planetary gear device configured to transfer power from the motor at a reduced speed.

The motor may be connected to supply power to a third sun gear of the third planetary gear device, the third planetary gear device may have a third ring gear fixed to a transmission case, and the third planetary gear device may have a third carrier directly connected to the first rotating element of the first planetary gear device.

In accordance with another aspect of the present disclosure, a torque vectoring device of a vehicle may include: a differential; a first planetary gear device; and a second planetary gear device. In particular, the first planetary gear device includes: a first rotating element connected to a differential case of the differential, a second rotating element fixed to a transmission case, and a third rotating element connected to a connecting member. The second planetary gear device includes: a fourth rotating element connected to a motor to receive power from a motor, a fifth rotating element connected to the connecting member and a first clutch gear, and a sixth rotating element connected to a second clutch gear. The torque vectoring device further includes a selective connector configured to selectively connect the second clutch gear to the first clutch gear or a selected drive shaft which is one of two drive shafts coupled to both sides of the differential.

The selective connector may include: a hub gear provided integrally with the selected drive shaft; and a sleeve configured to be able to switch between a state in which the sleeve slides straightly along an axial direction while meshing with the second clutch gear and thus meshes with the first clutch gear and a state in which the sleeve meshes with the hub gear.

The first planetary gear device may have a first ring gear fixed to the transmission case, a first carrier connected to the differential case of the differential, and a first sun gear connected to the connecting member. The second planetary gear device may have a second ring gear connected to the motor such that power is input from the motor, a second carrier connected to the second clutch gear, and a second sun gear connected to the connecting member and the first clutch gear.

The first planetary gear device and the second planetary gear device may be installed on one side of the differential case to be adjacent to each other, and the selective connector may be provided between the second planetary gear device and the selected drive shaft.

The motor may be connected to the first ring gear in an external gear type.

The motor may be connected to transfer power at a reduced speed to the first ring gear by using a third planetary gear device.

The present disclosure is advantageous in that torque vectoring of both driving wheels can be controlled by a relatively simple configuration such that the vehicle traveling performance can be improved, thereby ultimately improving the product value of the vehicle.

BRIEF DESCRIPTION OF THE DRAWINGS

The above and other aspects, features, and advantages of the present disclosure should be more apparent from the following detailed description taken in conjunction with the accompanying drawings, in which.

DETAILED DESCRIPTION

Figure 1:
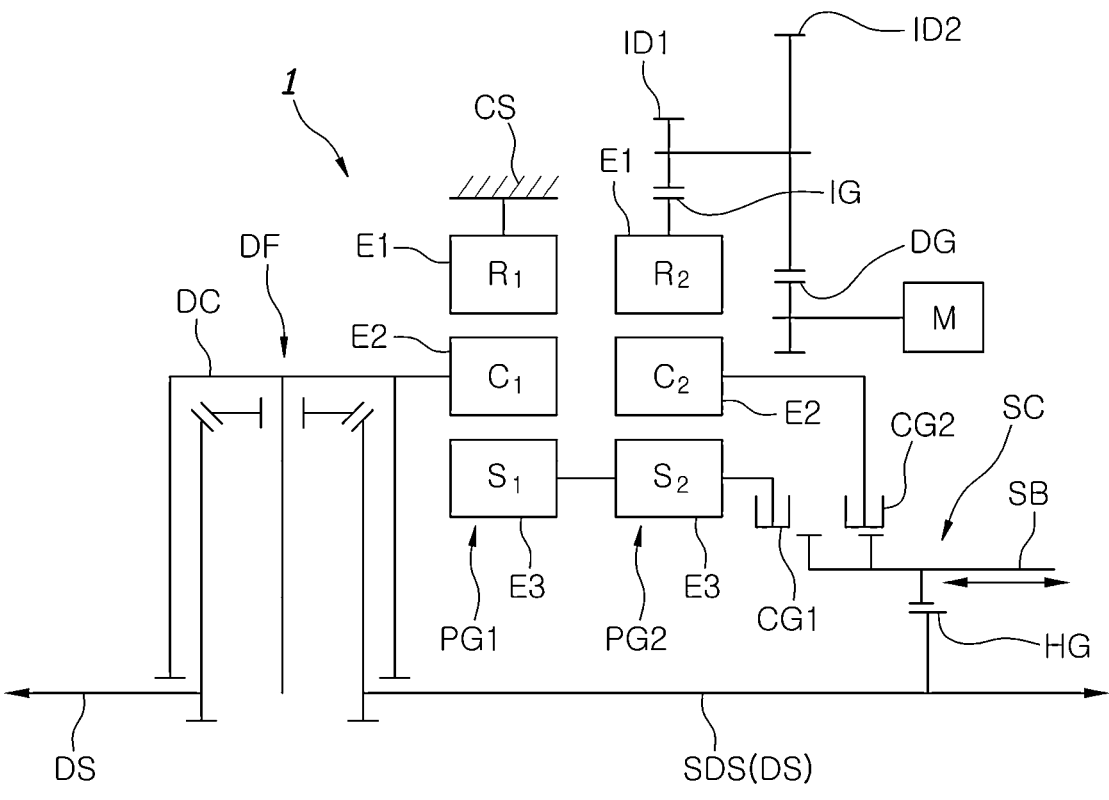
FIG. 1 illustrates a torque vectoring device of a vehicle in a torque vectoring mode according to an embodiment of the present disclosure.

Hereinafter, embodiments disclosed in the present specification are described in detail with reference to the accompanying drawings, and the same or similar elements are given the same and similar reference numerals, so duplicate descriptions thereof have been omitted.

The terms "module" and "unit" used for the elements in the following description are given or interchangeably used in consideration of only the ease of writing the specification, and do not have distinct meanings or roles by themselves.

In describing the embodiments disclosed in the present specification, when the detailed description of the relevant known technology is determined to unnecessarily obscure the gist of the present disclosure, the detailed descriptions have been omitted. Furthermore, the accompanying drawings are provided only for easy understanding of the embodiments disclosed in the present specification, and the technical spirit disclosed herein is not limited to the embodiments illustrated in the accompanying drawings, and it should be understood that all changes, equivalents, or substitutes thereof are included in the spirit and scope of the present disclosure.

Terms including an ordinal number such as "first", "second", or the like may be used to describe various elements, but the elements are not limited to the terms. The above terms are used only for the purpose of distinguishing one element from another element.

In the case where an element is referred to as being "connected" or "coupled" to any other element, it should be understood that another element may be provided therebetween, as well as that the element may be directly connected or coupled to the other element. In contrast, in the case where an element is "directly connected" or "directly coupled" to any other element, it should be understood that no other element is present therebetween.

A singular expression may include a plural expression unless they are definitely different in a context. When a component, device, element, or the like of the present disclosure is described as having a purpose or performing an operation, function, or the like, the component, device, or element should be considered herein as being "configured to" meet that purpose or to perform that operation or function.

As used herein, the expression "include" or "have" are intended to specify the existence of mentioned features, numbers, steps, operations, elements, components, or combinations thereof, and should be construed as not precluding the possible existence or addition of one or more other features, numbers, steps, operations, elements, components, or combinations thereof.

A unit or a control unit included in names such as a motor control unit (MCU) and a hybrid control unit (HCU) is merely a term widely used for naming a controller configured to control a specific function of a vehicle, but does not mean a generic function unit.

A controller may include a communication device configured to communicate with a sensor or another control unit, a memory configured to store an operation system, a logic command, or input/output information, and at least one processor configured to perform determination, calculation, decision or the like which are required for responsible function controlling.

Referring to FIGS. 1-6, a torque vectoring device 1 for a vehicle according to an embodiment of the present disclosure includes: a differential "DF"; a first planetary gear device "PG1" having a first rotating element "E1" fixed thereto and having a second rotating element "E2" connected to a differential case "DC" of the differential DF; and a second planetary gear device "PG2" having a motor "M" connected to a first rotating element E1 and having a third rotating element "E3" connected to the third rotating element E3 of the first planetary gear device PG1. The torque vectoring device 1 further includes a selective connector "SC" configured such that the second rotating element E2 of the second planetary gear device PG2 can be selectively connected to the third rotating element E3 of the second planetary gear device PG2 or a selected drive shaft "SDS." The selected drive shaft SDS refers to a drive shaft selected among two drive shafts DS coupled to the differential DF.

According to one embodiment of the present disclosure, an operating mode of the torque vectoring device 1 is switched between a torque vectoring mode and a driving mode according to whether the second rotating element E2 of the second planetary gear device PG2 by the operation of the selective connector SC is connected to the third rotating element E3 of the second planetary gear device PG2 or the selected drive shaft SDS. Power is able to be transferred from the motor to the differential case DC successively through the second planetary gear device PG2 and the first planetary gear device PG1, and directly to the selected drive shaft SDS through the second planetary gear device PG2.

In one embodiment, the first rotating element E1 of the first planetary gear device PG1 is a first ring gear R1, the second rotating element E2 thereof is a first carrier C1, and the third rotating element E3 thereof is a first sun gear S1. The first rotating element E1 of the second planetary gear device PG2 is a second ring gear R2, the second rotating element E2 thereof is a second carrier C2, and the third rotating element E3 thereof is a second sun gear S2.

Therefore, the first sun gear S1 of the first planetary gear device PG1 is directly connected to the second sun gear S2 of the second planetary gear device PG2.

The selective connector SC includes: a first clutch gear "CG1" connected to the second sun gear S2; a second clutch gear "CG2" connected to the second carrier C2; a hub gear "HG" provided on the selective drive shaft SDS; and a sleeve "SB" configured to slide along an axial direction (i.e., a longitudinal direction of the drive shafts DS) such that the sleeve SB is able to switch between a first state in which the sleeve SB slides straightly along the axial direction from the second clutch gear CG2 and meshes with the first clutch gear CG1 and a second state in which the sleeve SB meshes with the hub gear HG.

Figure 4:
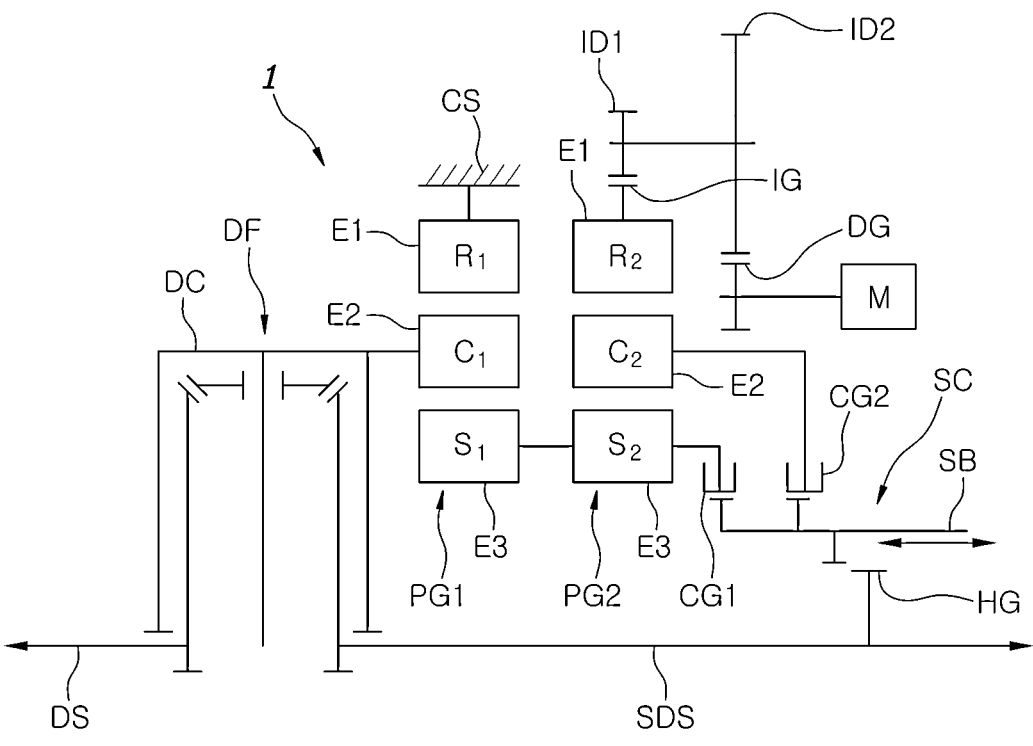
FIG. 4 illustrates the torque vectoring device in FIG. 1, which implements a driving mode.

Because the sleeve SB slides straightly along the axial direction, the torque vectoring device 1 may select the state illustrated in FIG. 1 or the state illustrated in FIG. 4.

As used herein, the "axial direction" refers to the longitudinal direction of the drive shafts DS, which is in parallel with the direction of the rotation axis of the first planetary gear device PG1 and the second planetary gear device PG2.

A separate actuator and a separate controller may be connected to the sleeve SB such that the sleeve SB slides straightly. The controller may drive the actuator according to the vehicle traveling situation such that the sleeve SB slides straightly, thereby selecting a mode appropriate for the vehicle traveling situation.

In one form, the sleeve SB, the first clutch gear CG1, and the second clutch gear CG2 may be configured in a conventional dog clutch type, or configured to include a synchronizer ring, a key, and the like as in the case of a conventional synchromesh type device.

The first planetary gear device PG1 and the second planetary gear device PG2 are disposed on the side on which the selective drive shaft SDS is disposed, with reference to the differential case DC.

Therefore, the selective connector SC for coupling the second carrier C2 of the second planetary gear device PG2 to the selected drive shaft SDS or decoupling the second carrier C2 may be configured more easily.

An input gear "IG" is connected to the first rotating element E1 of the second planetary gear device PG2, and a drive gear "DG" is connected to the rotating shaft of the motor M. A first idler gear "ID1" and a second idler gear "ID2" are respectively connected to the input gear and the drive gear and are arranged concentrically with each other.

Therefore, power of the motor M is transmitted to the first sun gear S1 through the drive gear DG, the second idler gear ID2, the first idler gear ID1, and the input gear IG.

Figure 8:
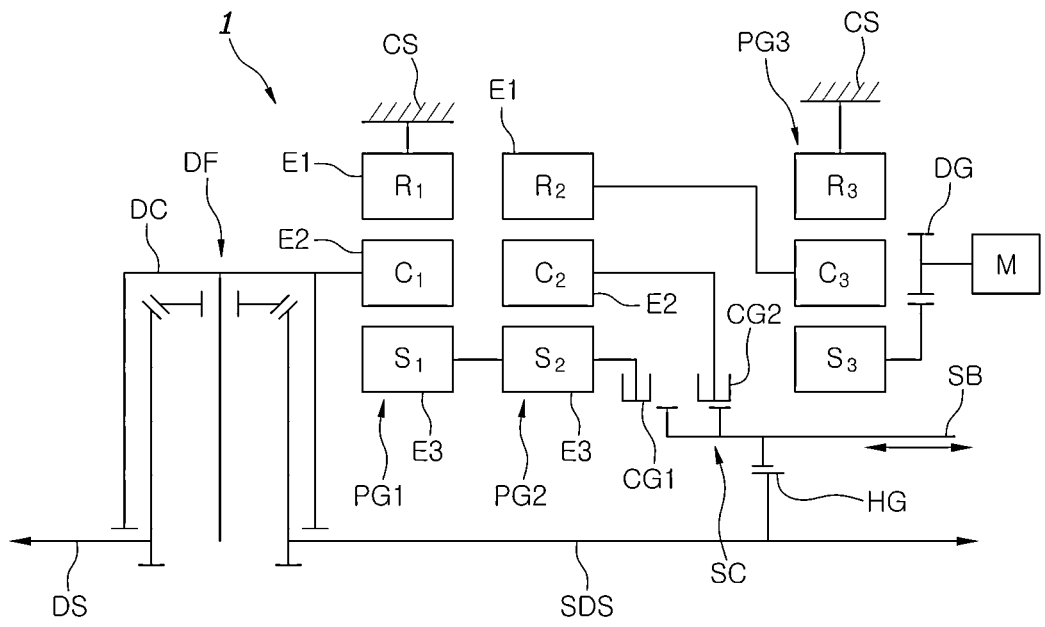
FIG. 8 illustrates the state of a torque vectoring mode according to a second embodiment of the present disclosure.
Figure 9:
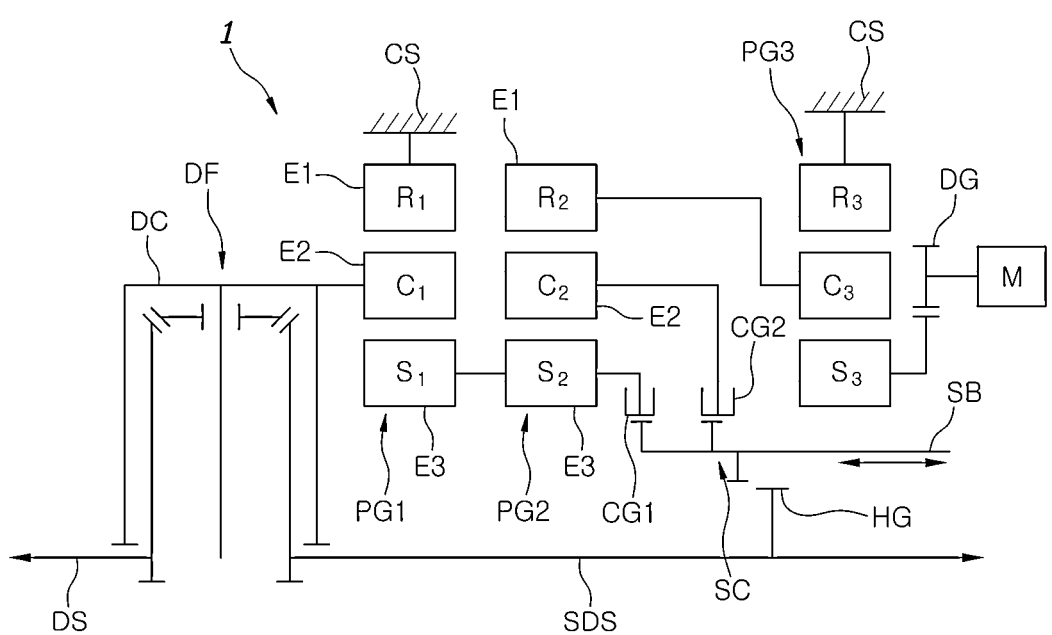
FIG. 9 illustrates the torque vectoring device in FIG. 8, which implements a driving mode.

Meanwhile, As illustrated in FIG. 8 and FIG. 9, a second embodiment of the present disclosure has the same configuration as that of the embodiment in FIG. 1, except for a connection relation between the first rotating element E1 of the second planetary gear device PG2 and the motor M.

In other words, in the second embodiment in FIG. 8, the first rotating element E1 of the second planetary gear device PG2 is connected to the motor M through a third planetary gear device PG3 configured to transfer power from the motor M at a reduced speed.

In other words, the motor M is connected to supply power to the third sun gear S3 of the third planetary gear device PG3. The third planetary gear device PG3 has a third ring gear R3 fixed to the transmission case CS and has a third carrier C3 directly connected to the first rotating element E1 of the first planetary gear device PG1.

Therefore, power of the Motor is transmitted to the second rotating element E2 of the first planetary gear device PG1 through the third carrier C3 at a reduced speed.

Figure 7:
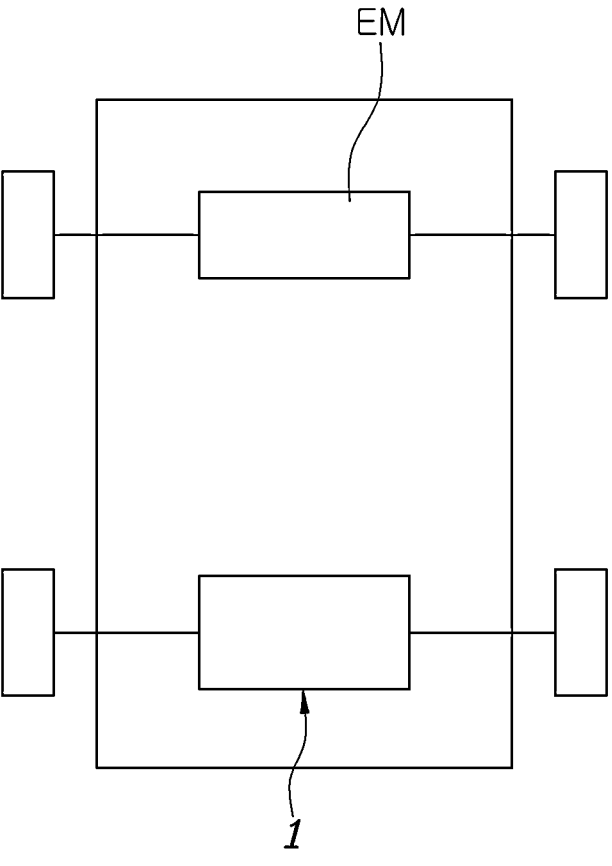
FIG. 7 illustrates a vehicle to which the present disclosure is applied.

FIG. 7 illustrates a vehicle having the torque vectoring device 1 according to embodiments of the present disclosure. As described above, the vehicle may include a separate driving device (e.g., an electric motor EM or engine) connected to one of the front wheels and the rear wheels to drive, and the other wheel controlled by the torque vectoring device 1.

In one form, as illustrated in FIG. 7, the front wheels are provided by a driving device (e.g., an electric motor EM or engine), and the rear wheels are driven by the torque vectoring device 1 according to the present disclosure.

In this case, the driving mode of the present disclosure may be used to assist normal traveling of the vehicle, or to drive the rear wheels by power from the motor M of the torque vectoring device 1 according to the present disclosure, when the front wheels are in a rough terrain, such that the vehicle can escape the rough terrain.

Figure 5:
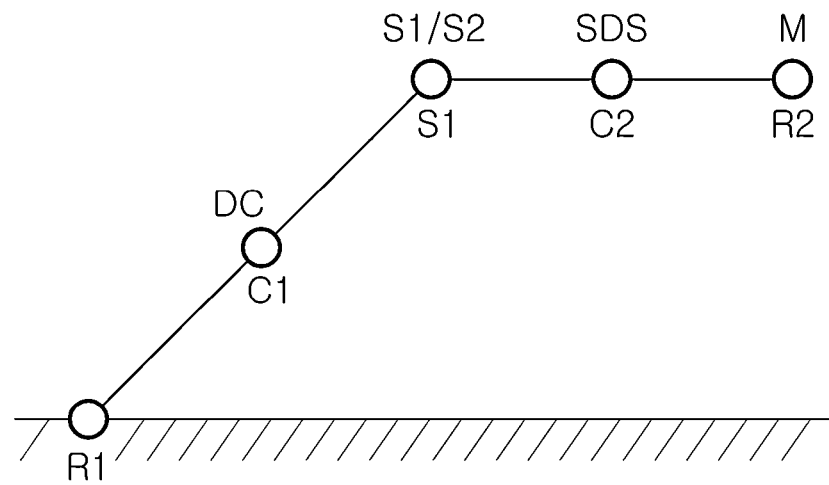
FIG. 5 is a lever diagram illustrating the state in FIG. 3.
Figure 6:
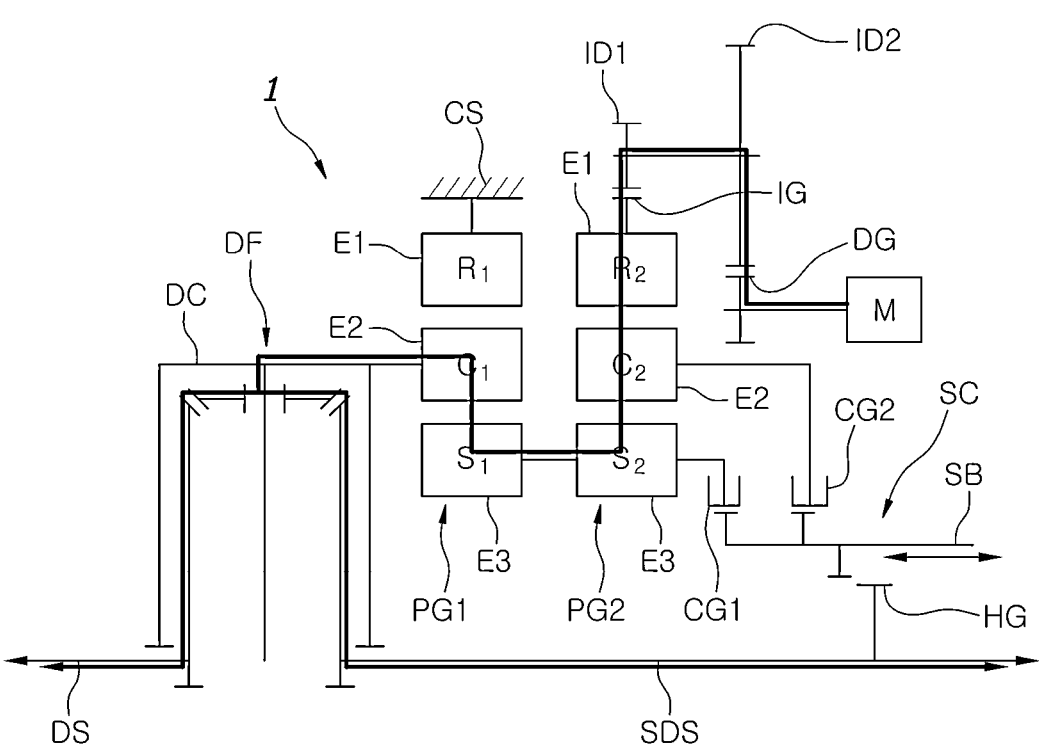
FIG. 6 illustrates a flow of power in the state in FIG. 4.

In other words, as illustrated in FIGS. 4-6, if the sleeve SB connects the first clutch gear CG1 and the second clutch gear CG2 such that the second sun gear S2 and the second carrier C2 are directly connected, the second planetary gear device PG2 is self-locked such that all rotating elements rotate as a single rotating body. As a result, power of the motor is input to the second ring gear R2 and then transferred to the first sun gear S1 substantially intact. Then, according to the reduction ratio of the first planetary gear device PG1, the first carrier C1 transfers the power to the differential case DC at a reduced speed.

The selected drive shaft SDS and the drive shaft DS, which are respectively coupled to both sides of the differential case DC, receive power from the differential case DC and drive both rear wheels such that, by moving the vehicle, the front wheels escape from the rough terrain.

Figure 2:
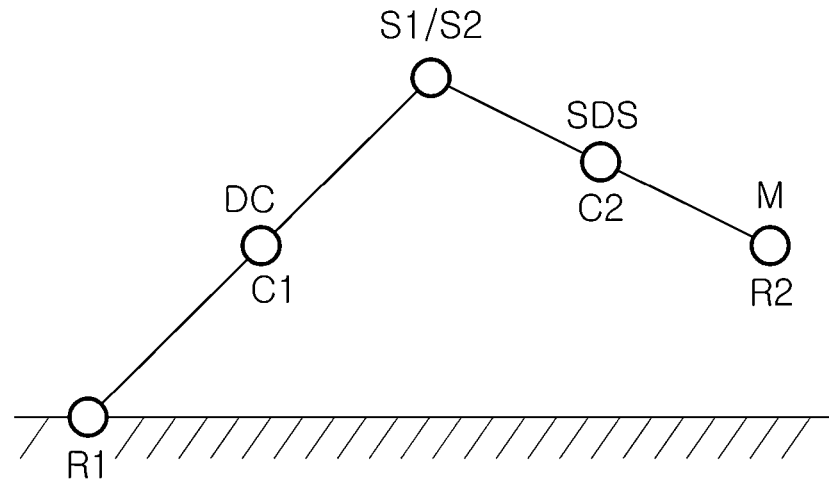
FIG. 2 is a lever diagram illustrating the state in FIG. 1.
Figure 3:
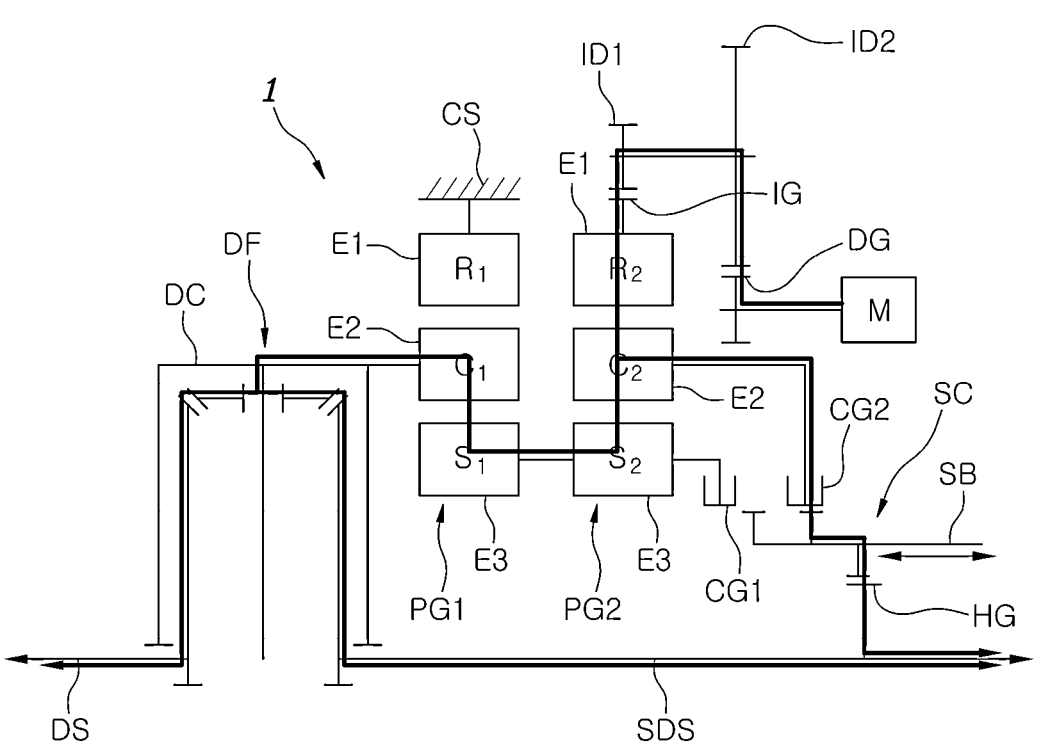
FIG. 3 illustrates a flow of power in the state in FIG. 1.

In the torque vectoring mode, the sleeve SB connects the second clutch gear CG2 to the hub gear HG such that, in connection with power supplied from the motor M, the difference in speed between the first carrier C1 and the second carrier C2 can be adjusted, as illustrated in FIG. 2.

Therefore, the speed and torque of the differential case DC and the selected drive shaft SDS are adjusted according to control of the motor M such that the status of driving of both rear wheels can be actively customized to the vehicle traveling situation.

Such improvement in vehicle traveling performance may improve the product value of the vehicle.

In another embodiment of the present disclosure, a torque vectoring device for a vehicle may have the following configuration.

A torque vectoring device for a vehicle may include: a differential DF; a first planetary gear device PG1 having a rotating element connected to a differential case DC of the differential DF, having another rotating element fixed to a transmission case CS, and having the remaining rotating element connected to a connecting member CM; a second planetary gear device PG2 having a rotating element connected to a motor M such that power can be transferred from a motor M, having another rotating element connected to the connecting member CM and connected to a first clutch gear CG1, and having the remaining rotating element connected to a second clutch gear CG2; and a selective connector SC configured such that the second clutch gear CG2 can be selectively connected to the first clutch gear CG1 or to a selected drive shaft SDS which is one of two drive shafts DS coupled to both sides of the differential DF.

The selective connector SC includes: a hub gear HG provided integrally with the selected drive shaft SDS; and a sleeve SB provided to be able to switch between a first state in which the sleeve SB slides straightly along an axial direction while meshing with the second clutch gear CG2 and thus meshes with the first clutch gear CG1 and a second state in which the sleeve SB meshes with the hub gear HG.

The first planetary gear device PG1 has a first ring gear R1 fixed to the transmission case CS, has a first carrier C1 connected to the differential case DC of the differential DF, and has a first sun gear S1 connected to the connecting member CM.

The second planetary gear device PG2 has a second ring gear R2 connected such that power is input from the motor M, has a second carrier C2 connected to the second clutch gear CG2, and has a second sun gear S2 connected to the connecting member CM and the second clutch gear CG2.

The connecting member CM may be formed as a separate component. Alternatively, the first sun gear S1 or the second sun gear S2 may extend so as to constitute the connecting member CM.

The first planetary gear device PG1 and the second planetary gear device PG2 are installed on one side of the differential case DC to be adjacent to each other. The selective connector SC is provided between the second planetary gear device PG2 and the selected drive shaft SDS.

The motor M may be connected to the first ring gear R1 in an external gear type.

The motor M may be connected so as to transfer power to the first ring gear R1 at a reduced speed by using a third planetary gear device PG3.

Although the present disclosure has been described and illustrated in conjunction with particular embodiments thereof, it should be apparent to those having ordinary skill in the art that various improvements and modifications may be made to the embodiments without departing from the technical idea of the present disclosure.

What is claimed is:

1. A torque vectoring device for a vehicle, the torque vectoring device comprising:
   a differential;
   a first planetary gear device including:
      a first element fixed to a transmission case, and
      a second rotating element directly connected to a differential case of the differential;
   a second planetary gear device including:
      a first rotating element connected to a motor, and
      a third rotating element connected to a third rotating element of the first planetary gear device; and
      a selective connector configured to directly and selectively connect a second rotating element of the second planetary gear device to the third rotating element of the second planetary gear device or a selected drive shaft, wherein the selected drive shaft is a drive shaft among two drive shafts coupled to the differential.

2. The torque vectoring device of claim 1, wherein the first element of the first planetary gear device is a first ring gear, the second rotating element of the first planetary gear device is a first carrier, the third rotating element of the first planetary gear device is a first sun gear, and
   wherein the first rotating element of the second planetary gear device is a second ring gear, the second rotating element of the second planetary gear device is a second carrier, and the third rotating element of the second planetary gear device is a second sun gear.

3. The torque vectoring device of claim 2, wherein the selective connector comprises:
   a first clutch gear connected to the second sun gear;
   a second clutch gear connected to the second carrier;
   a hub gear provided on the selected drive shaft; and
   a sleeve configured to switch between a first state in which the sleeve slides straightly along an axial direction from the second clutch gear and thus meshes with the first clutch gear and a second state in which the sleeve meshes with the hub gear.

4. The torque vectoring device of claim 3, wherein the first planetary gear device and the second planetary gear device are disposed on a side on which the selected drive shaft is disposed with reference to the differential case.

5. The torque vectoring device of claim 3, wherein an input gear is connected to the first rotating element of the second planetary gear device, a drive gear is connected to a rotating shaft of the motor, and a first idler gear and a second idler gear are connected by a concentric shaft and are connected to the input gear and the drive gear, respectively.

6. The torque vectoring device of claim 3, wherein the first rotating element of the second planetary gear device is connected to the motor through a third planetary gear device configured to transfer power from the motor at a reduced speed.

7. The torque vectoring device of claim 6, wherein the motor is connected to supply power to a third sun gear of the third planetary gear device, the third planetary gear device has a third ring gear fixed to the transmission case, and the third planetary gear device has a third carrier directly connected to the first element of the first planetary gear device.

8. A vehicle comprising the torque vectoring device of claim 1, wherein the torque vectoring device is provided for predetermined wheels among front wheels and rear wheels of the vehicle, and a separate driving device is provided for remaining wheels among the front wheels and the rear wheels.

9. A torque vectoring device comprising:
   a differential;
   a first planetary gear device including:
      a first rotating element directly connected to a differential case of the differential,
      a second element fixed to a transmission case, and
      a third rotating element directly connected to a connecting member;
   a second planetary gear device including:
      a fourth rotating element connected to a motor to receive power from the motor,
      a fifth rotating element directly connected to the connecting member and a first clutch gear, and
      a sixth rotating element directly connected to a second clutch gear; and
   a selective connector configured to selectively connect the second clutch gear to the first clutch gear or a selected drive shaft which is one of two drive shafts coupled to both sides of the differential.

10. The torque vectoring device of claim 9, wherein the selective connector comprises:

a hub gear provided integrally with the selected drive shaft; and a sleeve configured to switch between a first state in which the sleeve slides straightly along an axial direction while meshing with the second clutch gear and thus meshes with the first clutch gear and a second state in which the sleeve meshes with the hub gear.

11. The torque vectoring device of claim 10, wherein the second element is a first ring gear fixed to the transmission case, the first rotating element is a first carrier connected to the differential case of the differential, and the third rotating element is a first sun gear connected to the connecting member, and wherein the fourth rotating element is a second ring gear configured to receive the power from the motor, the sixth rotating element is a second carrier connected to the second clutch gear, and the fifth rotating element is a second sun gear connected to the connecting member and the first clutch gear.

12. The torque vectoring device of claim 11, wherein the first planetary gear device and the second planetary gear device are installed on one side of the differential case to be adjacent to each other, and the selective connector is provided between the second planetary gear device and the selected drive shaft.

13. The torque vectoring device of claim 11, wherein the motor is connected to the first ring gear in an external gear type.

14. The torque vectoring device of claim 11, wherein the motor is connected to transfer power at a reduced speed to the first ring gear by using a third planetary gear device.

* * * * *